US011333790B2

(12) United States Patent
Rothenberger et al.

(10) Patent No.: US 11,333,790 B2
(45) Date of Patent: May 17, 2022

(54) METHOD OF SETTING A PLURALITY OF PART REGIONS OF A DESIRED PROTECTED ZONE

(71) Applicant: SICK AG, Waldkirch/Breisgau (DE)

(72) Inventors: Bernd Rothenberger, Rheinhausen (DE); Jonas Rist, Freiburg (DE); Manfred Haberer, Riegel (DE)

(73) Assignee: SICK AG, Waldkirch/Breisgau (DE)

( * ) Notice: Subject to any disclaimer, the term of this patent is extended or adjusted under 35 U.S.C. 154(b) by 593 days.

(21) Appl. No.: 15/259,241

(22) Filed: Sep. 8, 2016

(65) Prior Publication Data
US 2017/0075027 A1 Mar. 16, 2017

(30) Foreign Application Priority Data
Sep. 11, 2015 (EP) .................................... 15184874

(51) Int. Cl.
| G01V 8/10 | (2006.01) |
| G01S 17/42 | (2006.01) |
| F16P 3/14 | (2006.01) |
| B25J 9/16 | (2006.01) |
| G05B 19/4061 | (2006.01) |
| G01S 17/87 | (2020.01) |
| G08B 29/18 | (2006.01) |

(52) U.S. Cl.
CPC .............. *G01V 8/10* (2013.01); *B25J 9/1676* (2013.01); *F16P 3/14* (2013.01); *G01S 17/42* (2013.01); *G01S 17/87* (2013.01); *G05B 19/4061* (2013.01); *G05B 2219/37631* (2013.01); *G05B 2219/40478* (2013.01); *G05B 2219/49152* (2013.01); *G08B 29/18* (2013.01)

(58) Field of Classification Search
CPC ........ G01S 17/42; G01S 17/87; B25J 9/1676; F16P 3/14; G05B 19/4061; G05B 2219/37631; G05B 2219/40478; G05B 2219/49152; G01V 8/10; G08B 29/18
See application file for complete search history.

(56) References Cited

U.S. PATENT DOCUMENTS

| 7,813,529 B1 * | 10/2010 | Gershenson ........... G01C 11/06 356/4.04 |
| 2008/0165266 A1 * | 7/2008 | Jenkins ................. G06F 3/0418 348/333.01 |
| 2010/0194859 A1 * | 8/2010 | Heigl ............... G08B 13/19641 348/46 |

(Continued)

FOREIGN PATENT DOCUMENTS
DE 102007053812 A1 5/2009

*Primary Examiner* — Eyob Hagos
(74) *Attorney, Agent, or Firm* — Nath, Goldberg & Meyer; Jerald L. Meyer

(57) ABSTRACT

The invention relates to a method of setting a plurality of part regions of a desired protected zone, in which
a) the positions of a plurality of monitoring units are detected, with each monitoring unit detecting a detection zone;
b) a maximum size of each detection zone is determined;
c) the desired protected zone is fixed in a graphical user interface;
d) the part regions to be monitored by the respective monitoring units are fixed with reference to the positions of the monitoring units, to the maximum size of the detection zones and of the desired protected zone; and
e) the part regions are assigned to the respective monitoring units.

20 Claims, 1 Drawing Sheet

(56) References Cited

U.S. PATENT DOCUMENTS

Figure 1:
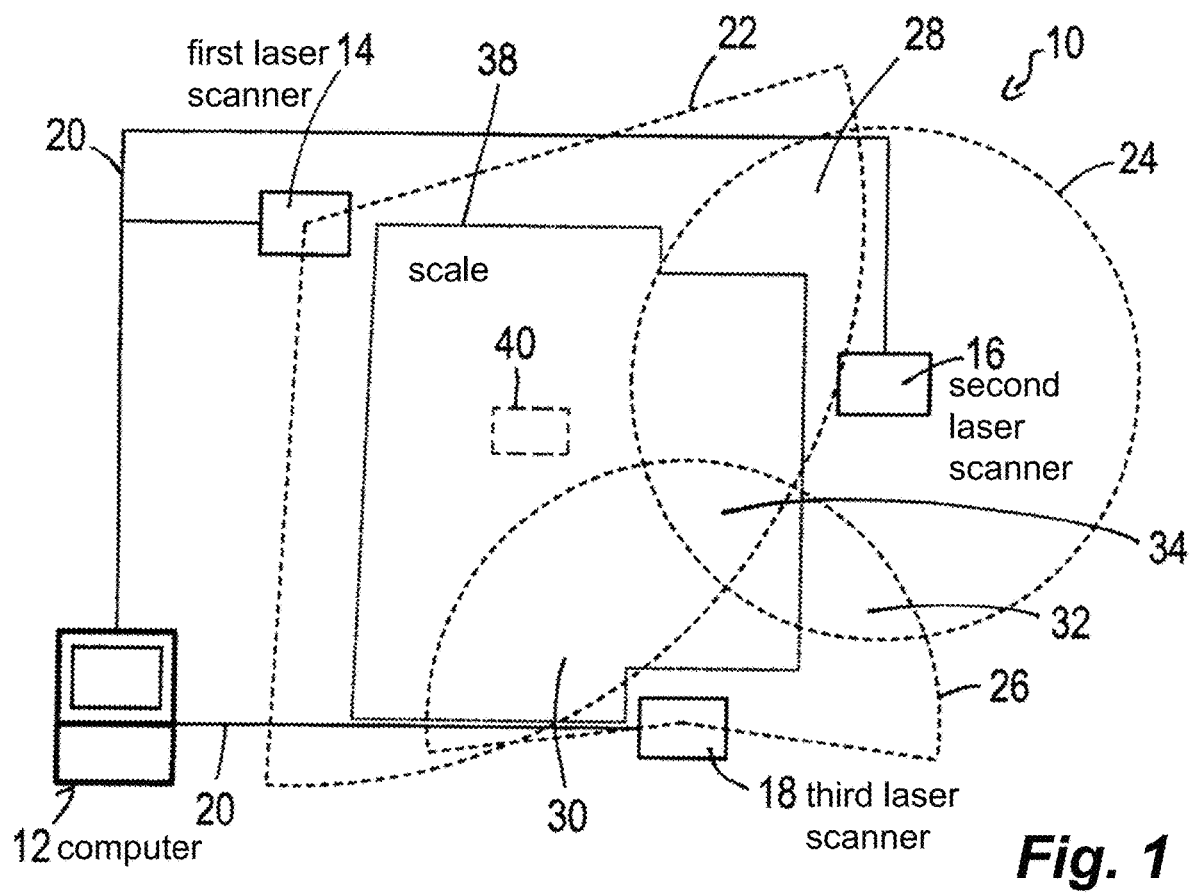

| | | | |
|---|---|---|---|
| 2012/0123563 A1* | 5/2012 | Drinkard | F16P 3/144 700/13 |
| 2012/0274466 A1* | 11/2012 | Mezger | G08B 13/183 340/557 |

* cited by examiner

METHOD OF SETTING A PLURALITY OF PART REGIONS OF A DESIRED PROTECTED ZONE

The present invention relates to a method of setting a plurality of part regions of a desired protected zone.

Monitoring units such as laser scanners are used to monitor so-called protected zones. It can, for example, be determined when monitoring the protected zone whether a person has entered the protected zone, whereupon the operation of a machine located in the vicinity or of a robot located in the vicinity can be shut down.

A monitoring unit can in particular be configured during its installation or also subsequently such that a desired protected zone is monitored which is in particular a portion of a maximum detection zone of the monitoring unit. Objects or persons can optionally also be detected and recognized in the total detection zone. Unlike persons or objects located in the protected zone, a person located in the remaining detection zone, however, does not, for example, trigger the shutting down of machinery.

If the region to be secured, i.e. the desired protected zone, is larger than the range of a single monitoring unit, i.e. larger than the detection zone of a single monitoring unit, two or more monitoring units have to be used together and have to be configured suitably to cover the total protected zone.

Conventionally, every part region of the protected zone has to be individually drawn, i.e. fixed, in such a case. The configuration of a monitoring unit is changed accordingly for this purpose. The configuration of the next monitoring unit is subsequently adapted. This procedure has to be repeated for every monitoring unit, which can be very time-consuming and/or expensive for a user since an adaptation of different part regions to one another can require a plurality of iterations of changes of the part regions. In addition, a physical access to the different monitoring units may be necessary.

It is therefore the underlying object of the invention to provide a method of setting a plurality of part regions of a desired protected zone which facilitates the setting up of a protected zone.

This object is satisfied in accordance with the invention by a method having the features of claim 1.

The invention relates to a method in which
a) the positions of a plurality of monitoring units are detected, with each monitoring unit detecting a detection zone;
b) a maximum size of each detection zone is determined;
c) the desired protected zone is fixed in a graphical user interface (GUI);
d) the part regions to be monitored by the respective monitoring units are fixed with reference to the positions of the monitoring units, to the maximum size of the detection zones and of the desired protected zone; and
e) the part regions are assigned to the respective monitoring units.

The method is particularly simple for setting a protected zone which is to be monitored using a plurality of scanners.

It is of advantage in the method in accordance with the invention that the individual part regions no longer have to be fixed manually, but can rather be determined in an automated manner. In addition, the part regions defined in this manner can be transmitted in an automated manner to the respective monitoring units, whereby a fully automatic configuration of the monitoring units can take place after the fixing of the desired protected zone. The method in accordance with the invention can in particular be carried out by means of a single piece of software such as will be described further below.

The steps to be carried out for the method in accordance with the invention will be described in more detail in the following.

First, the positions of the monitored units have to be detected, i.e. their relative positions with respect to one another or their absolute positions in space. A position can be understood as a two-dimensional position in a plane or as a three-dimensional position in a space. The positions of the monitoring units can e.g. be detected by the monitoring units themselves and can be transmitted, for example, to a piece of software carrying out the method.

The maximum size of each detection zone is additionally determined. The detection zone can correspond to the safe region of the respective monitoring unit.

It is additionally necessary that the desired protected zone is determined which is fixed or drawn in the graphical user interface for this purpose, for example, by a user. In addition, the positions of the monitoring units can be displayed in the graphical user interface, with the virtual positions preferably representing the real positions.

As soon as the positions and alignments of the monitoring units are known whose detection zones are known and as soon as the desired protected zone is known, the part regions can be fixed. Finally, the part regions can be assigned to the respective monitoring units, i.e. can in particular be communicated to the monitoring units by means of a data transmission.

The invention thus allows the division of complex protected zones, which are monitored by a plurality of monitoring units, to be carried out in a simple manner and with a low effort and/or cost.

Advantageous further developments of the invention can be seen from the description, from the dependent claims and from the drawings.

In accordance with a first advantageous embodiment, the alignment of the monitoring units is also detected. This means that the direction or the directed arrangement of the monitoring units is determined. The alignment of the monitoring units can likewise be considered in the fixing of the part regions, in particular when the monitoring units do not have a detection zone which extends uniformly about 360° about the monitoring unit.

In addition, a determination of the alignment is important when the 0° position of the monitoring unit is otherwise not known, that is does not e.g. already result from simply the knowledge of the position of the monitoring unit due to the design.

The part regions are preferably at least partly fixed for overlap regions of the protected zone which can be monitored by a plurality of monitoring units such that only exactly one respective monitoring unit monitors the respective overlap region. An unambiguous association as to which of the monitoring units monitors the respective point can thus be made for each point of the desired protected zone.

Alternatively or additionally, regions of the desired protected zone can also be fixed which are to be simultaneously monitored by a plurality of monitoring units. How many monitoring units should monitor or scan the respective region can in particular also be fixed for such regions.

Further alternatively or additionally, boundary regions having a predefined width can be fixed for boundaries between two part regions, said boundary regions each being associated with both part regions and accordingly being monitored by at least two respective monitoring units. It can be ensured in this manner that no regions arise which are not monitored at the boundaries between the part regions. The width of such a boundary region can, for example, be 30 or 60 cm so that the boundary region extends 15 or 30 cm wide at both sides of the boundary in each case. The overlap region can e.g. respectively only be monitored by one monitoring unit outside the boundary region.

In accordance with a further advantageous embodiment, the part regions for overlap regions of the protected zone which can be monitored by a plurality of monitoring units are fixed such that in each case only exactly that monitoring unit monitors the overlap region which is closest to the respective overlap region, i.e. which has the smallest spacing from the monitored zone. Which monitoring unit is responsible for which point of the protected zone can in each case be unambiguously defined by means of such a fixing. Conflicts in the fixing of the part regions can thus be avoided. The spacing of the monitoring unit from the respective overlap region can be determined, for example, with respect to the center of gravity of the surface of the overlap region.

Alternatively or additionally, the part regions for overlap regions of the protected zone which can be monitored by a plurality of monitoring units are fixed such that in each case exactly only that monitoring unit monitors the overlap region which is closest to the respective overlap region with respect to the size of its detection zone. This means that monitoring units having a very large detection zone can also be used for the monitoring of overlap regions which are closer to another monitoring unit. It is thus achieved that the overlap regions are each monitored by monitoring units whose detection zones extend beyond the overlap region. A detection of objects at the margin of the respective detection zone is then not necessary, whereby the precision and reliability of the detection of objects or persons can be increased.

That laser scanner can in particular monitor the overlap region which is closest to the overlap region percentagewise with respect to its range with an overlap region which lies in the detection zone of two laser scanners. For example, for a first scanner which has a range of 4 m and which has a circular detection zone having a radius of 4 m and for a second scanner which has a range of 15 m, an overlap region is assigned to the second scanner which is 3 m remote from both scanners 3.

Alternatively, the precision with which the monitoring unit can detect or scan a respective point can also be determined for each point of the protected zone, with then that monitoring unit being selected for a respective point or a respective part region which has the highest accuracy there.

Particularly preferably, these monitoring units are set only to monitor the respective assigned part region. A laser scanner can, for example, be configured such that it only transmits laser pulses into the part region assigned to it. Overlaps with other monitoring units can be avoided in this manner, whereby external light influences can be reduced, for example. Alternatively or additionally, the monitoring units can be set such that only information from the protected zone originating from the respective part region is processed. The data volume to be processed by the monitoring units can hereby be reduced. A scan rate of the monitoring unit can e.g. also be increased if only a part region has to be monitored which is small in comparison with the total detection zone.

In accordance with a further advantageous embodiment, the desired protected zone comprises a plurality of mutually separate protected zone sections. The desired protected zone can therefore be split into a plurality of parts which, for example, to the left and to the right of a corridor.

In accordance with a further advantageous embodiment, an output of non-monitorable regions of the desired protected zone takes place. A warning can therefore be output which indicates that the desired protected zone cannot be completely covered by the monitoring units present. This warning can be output by a piece of software for inputting the desired protected zone and/or by the monitoring units themselves.

The desired protected zone can have regions not to be monitored within the protected zone. The regions not to be monitored can be so-called cut-out regions which do not have to be monitored or which should not be monitored. A cut-out region can, for example, be a pathway or corridor for persons in which the presence of persons is permitted.

The monitoring units can be set by the fixing of the part regions such that the cut-out regions are not monitored at all or such that at least no warning signal is output if a person or an article is detected in the cut-out region. On the other hand, information which is detected by the monitoring units and which originates from the cut-out regions can e.g. be discarded before its processing.

Contour regions within the desired protected zone are further preferably also determined and are taken into account in the fixing of the part regions. Contour regions are regions in which a specific contour, e.g. a column and the like, is permanently detected by the monitoring units. No detection or monitoring then needs to take place within the contour, which can be taken into account in the fixing of the part regions.

In addition, it can be taken into account when contour regions are present that regions e.g. in the environment of a column cannot be monitored by every monitoring unit since these regions can lie behind the column with respect to the respective monitoring unit. Such "hidden regions" can then be designed for monitoring with other monitoring units, i.e. can be associated with the part regions of other monitoring units.

The fixed part regions and/or the desired protected zone can particularly preferably be displayed and/or changed by means of software. The software can display the part regions and/or the protected zone by means of the graphical user interface and can additionally allow the part regions and/or the protected zone to be changed in the graphical user interface. Part regions and/or the protected zone can be adapted by drag and drop, for example.

The determination of the position and alignment of the monitoring units can e.g. take place automatically and/or can result at least in part from the geometrical and construction circumstances. The detection of the position can alternatively also take place manually. For this purpose, the measured data of the individual monitoring units can e.g. be shown on the graphical user interface and a user can drag or rotate the virtual positions of the monitoring units on the graphical user interface until their measured data coincide.

In accordance with a further development, the positions and alignments of the monitoring units are determined by means of a reference object. The dimensions and, optionally, the alignment of the reference object can be known for this purpose, with the monitoring units being able to determine their relative positions with respect to the reference object using the spacing or the relative size of the reference object and using its alignment. The positions and alignments determined in this manner can preferably be transmitted to a piece of configuration software in an automated manner.

All the method steps are preferably carried out by a single piece of software, whereby the establishing of protected zones which are monitored by means of a plurality of monitoring units can take place in a particularly simple manner. The software can preferably carry out or at least monitor all the method steps, i.e. can in particular determine the positions and alignments of the monitoring units, fix the part regions and configure the monitoring units in accordance with the fixed part regions.

In accordance with a further advantageous embodiment, the software places a site plan behind the displayed part regions and/or the desired protected zone. Conditions of a building and the like, for example, can be better taken into account by the site plan. Such a placing behind of a site plan can also make it easier to adapt the protected zone to existing walls, doors, pathways, etc.

As mentioned, the monitoring units can be laser scanners. A laser scanner detects the spatial structure of its environment in the form of a distance profile of one or more fixed planes. For this purpose, a transmitted beam is e.g. deflected over an angular range of up to 360° by means of a rotational mirror to scan the plane or planes in discrete angular steps. A short light pulse is transmitted at each angle and the time of flight up to the reception of the transmitted beam reflected or remitted by an object from the detection zone is measured and is then converted via the speed of light into a piece of distance information (TOF—(time of flight) method). An alternative method of determining the time of flight is the measurement of the phase shift between the amplitude-modulated transmitted light and received light.

The protected zones can be two-dimensional protected fields, with the part regions of such a two-dimensional protected field then being two-dimensional part-fields. The protected zones can, however, also generally be three-dimensional protected zones and can in this respect be three-dimensional part regions when the monitoring units are configured for monitoring a three-dimensional space. This can e.g. be achieved using monitoring units, e.g. using laser scanners, which are configured such that they monitor a plurality of planes differing by an angle in space or in that a plurality of two-dimensional monitoring units, e.g. laser scanners, are combined with one another such that they monitor respective different planes of the monitored space. The graphical user interface can be configured for such an application such that they can e.g. represent different sectional planes of the three-dimensional protected zone or such that the protected zone is shown perspectively.

The invention furthermore relates to a system comprising a processing unit and at least two monitoring units, with the processing unit and the monitoring units being coupled by means of a data connection. The system is configured to carry out the above-explained method.

The invention additionally relates to a computer program having program code means which are adapted such that a method of the above-explained kind is carried out when the program is executed on a computer.

The invention furthermore relates to a computer program product having program code means which are stored on a computer-readable data carrier and which are adapted such that a method of the above-explained kind is carried out when the program product is executed on a computer.

The statements made with respect to the method in accordance with the invention, in particular with respect to advantages and preferred embodiments, apply accordingly with respect to the system in accordance with the invention, to the computer program in accordance with the invention and to the computer program product in accordance with the invention.

The invention will be described in the following purely by way of example with reference to the drawings. There are shown:

FIG. 1 a system in accordance with the invention in a schematic view; and

Figure 2:
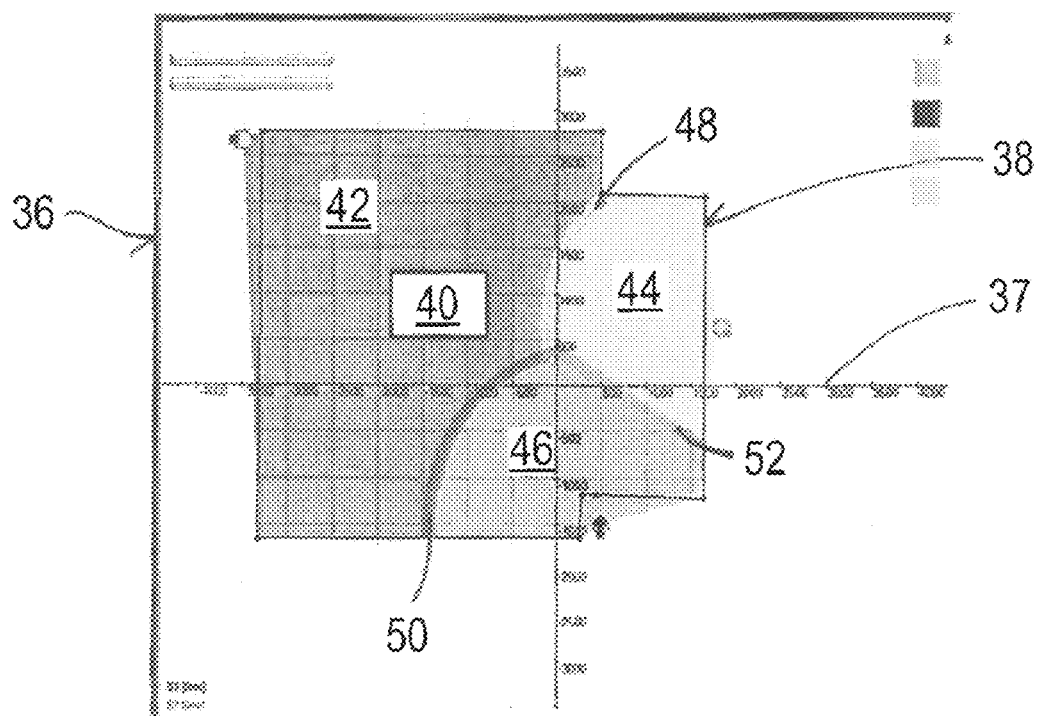

FIG. 2 a graphical user interface for fixing a desired protected field.

The example explained in the following relates to a method for setting a plurality of two-dimensional part fields of a desired two-dimensional protected field 38 for monitoring using laser scanners 14, 16, 18.

FIG. 1 shows a system 10 which has a computer 12 which is coupled to three monitoring units. The monitoring units are a first laser scanner 14, a second laser scanner 16 and a third laser scanner 18. The laser scanners 14, 16, 18 are connected to the computer 12 by means of a field bus.

The first laser scanner 14 scans a first detection zone 22; the second laser scanner 16 scans a second detection zone 24; and the third laser scanner 18 scans a third detection zone 26. The first detection zone 22 and the third detection zone 26 are in circular segment form, with the first detection zone 22 covering an angle of approximately 110° and the third detection zone 26 covering an angle of approximately 195°.

The second detection zone 24 is circular; this means that the second laser scanner 16 scans its surroundings in a range of 360°.

The first detection zone 22 and the second detection zone 24 overlap regionally and in this manner form a first overlap region 28. A second overlap region 30 is defined by the region which both the first detection zone 22 and the third detection zone 26 cover. The second detection zone 24 and the third detection zone 26 overlap in a third overlap region 32. A fourth overlap region 34 is located where the first, the second and the third detection zones 22, 24, 26 overlap.

A graphical user interface (GUI) 36 is shown in FIG. 2 which is provided by software on the computer 12. The GUI 36 comprises a scale 37 which shows the sizes shown in the GUI in relation with the actual sizes. A desired protected field 38 has been entered manually in the GUI 36.

The desired protected field 38 has a shape which approximately corresponds to two mutually adjacent rectangles. A cut-out region 40 which is not to be monitored is arranged within the desired protected field 38. The desired protected field 38 and the cut-out region 40 are also shown in FIG. 1.

The position and alignment of the laser scanners can e.g. be detected automatically. By way of non-limiting example, the positions of a plurality of monitoring units are detected by laser scanners. It is alternatively also conceivable that the position and alignment of the scanners are detected manually by the user. It is e.g. possible for this purpose that the measured data of the laser scanners are displayed on the GUI. The user can then drag the virtual positions of the scanners on the GUI and can optionally rotate them until their measured data overlap. Alternatively, the positions and alignments of the laser scanners can also be determined or verified using reference objects.

The detected positions can then serve as the basis for the subsequent automatic field segmentation.

The detection of the positions of the laser scanners in this respect also comprises the detection of their alignments to know the "direction of view" of the respective scanner or to know the 0° point of the respective scan.

After inputting the desired protected field 38 into the GUI 36, a calculation of the part fields is carried out by the software. The result of the calculation is shown in FIG. 2.

In accordance with FIG. 2, a first part field 42 should be monitored by the first laser scanner 14; a second part field 44 by the second laser scanner 16; and a third part field 46 by the third laser scanner 18. The part fields 42, 44, 46 are set such that every point of the desired protected field 38 is monitored by that laser scanner 14, 16, 18 which has the greatest measurement accuracy for the respective point.

A first boundary region 48 which is monitored by the first laser scanner 14 and the second laser scanner 16 extends between the first part field 42 and the second part field 44. In a corresponding manner, a second boundary region 50 which is monitored by the first laser scanner 14 and the third laser scanner 18 is located between the first part field 42 and the third part field 46. Finally, a third boundary region 52 is located between the second part field 44 and the third part field 46. The third boundary region 52 is monitored simultaneously by the second laser scanner 16 and the third laser scanner 18.

After the division of the part fields 42, 44, 46 by the software, a corresponding configuration of the laser scanners 14, 16, 18 is prepared by means of the software and is transmitted to the laser scanners 14, 16, 18 over the fieldbus 20 (FIG. 1). After the receipt of the configuration, the laser scanners 14, 16, 18 define those regions of their detection zones 22, 24, 26 as protected fields which correspond to the part fields 42, 44, 46. The cut-out region 40 is in this respect not defined as a protected field within the first part field 42. If, for example, a person enters the region defined as a protected field, a warning message can be output by the corresponding laser scanner 14, 16, 18 which can, for example, result in the shutting down of adjacent machines (not shown). In the operation of the system 10, the laser scanners 14, 16, 18 in this respect only scan their respective part fields 42, 44, 46 (together with the respective associated boundary regions 48, 50, 52). No scanning takes place outside the respective part field 42, 44, 46, whereby the data volume to be processed by the laser scanners 14, 16, 18 is reduced.

REFERENCE NUMERAL LIST 10 system
12 computer
14 first laser scanner
16 second laser scanner
18 third laser scanner
20 fieldbus
22 first detection zone
24 second detection zone
26 third detection zone
28 first overlap region
30 second overlap region
32 third overlap region
34 fourth overlap region
36 graphical user interface (GUI)
38 scale
40 desired protected field
42 cut-out region
44 first part field
46 second part field
48 third part field
50 first boundary region
52 second boundary region
third boundary region

The invention claimed is:

1. A method of setting a plurality of part regions of a desired protected zone, in which
   a) positions of a plurality of monitoring units are detected, wherein each of the plurality of monitoring units detects a detection zone;
   b) a maximum size of each detection zone is determined;
   c) the desired protected zone is fixed in a graphical user interface;
   d) the part regions to be monitored by the respective plurality of monitoring units are fixed with reference to the positions of the plurality of monitoring units, to the maximum size of the detection zones and to the desired protected zone; and
   e) the part regions are assigned to a respective one of the plurality of monitoring units,
   wherein the part regions are fixed at least in part for overlap regions of the protected zone which are monitorable by a plurality of monitoring units such that, in as least a portion of the overlap regions, only exactly that respective monitoring unit monitors the overlap region which is closest to the respective overlap region.

2. The method in accordance with claim 1, wherein, in step a), the positions of the plurality of monitoring units are detected by laser scanners.

3. The method in accordance with claim 1,
   wherein an alignment of the plurality of monitoring units is also detected.

4. The method in accordance with claim 1,
   wherein the part regions are at least partly fixed for overlap regions of the protected zone which can be monitored by a plurality of monitoring units such that only exactly one respective monitoring unit monitors the respective overlap region.

5. The method in accordance with claim 1,
   wherein the part regions are fixed at least in part for overlap regions of the protected zone which are monitorable by a plurality of monitoring units such that only exactly that respective monitoring unit monitors the overlap region which is closest to the respective overlap region with respect to the size of its detection zone.

6. The method in accordance with claim 1,
   in which
   f) the plurality of monitoring units are each set only to monitor the respective associated part region.

7. The method in accordance with claim 1,
   wherein the desired protected zone comprises a plurality of mutually separate protected zone sections.

8. The method in accordance with claim 1,
   wherein the desired protected zone has regions not to be monitored within the protected zone.

9. The method in accordance with claim 1,
   wherein an output of non-monitorable regions of the desired protected zone takes place.

10. The method in accordance with claim 1,
    wherein contour regions within the desired protected zone are also determined and are taken into account in the fixing of the part regions.

11. The method in accordance with claim 1,
    wherein the positions of the plurality of monitoring units are determined by means of a reference object.

12. The method in accordance with claim 1,
    wherein the fixed part regions and/or the desired protected zone can be set and/or changed by means of a piece of software.

13. The method in accordance with claim 12,
wherein the software places a site plan behind the displayed part regions and/or the desired protected zone.

14. A system having a processing unit and at least two monitoring units, wherein the processing unit and the monitoring units are coupled by means of a data connection and the system is configured to carry out a method in accordance with claim 1.

15. A computer program having a non-transitory computer-readable medium comprising program code adapted such that a method in accordance with claim 1 is carried out when the program is executed on a computer.

16. A method of setting a plurality of part regions of a desired protected zone, the method comprising:
   a) detecting positions of a plurality of monitoring units, wherein each of the plurality of monitoring units detects a detection zone;
   b) determining a maximum size of each detection zone;
   c) fixing the desired protected zone in a graphical user interface;
   d) fixing the part regions for monitoring by the respective plurality of monitoring units with reference to the positions of the plurality of monitoring units, to the maximum size of the detection zones and to the desired protected zone; and
   e) assigning the part regions to a respective one of the plurality of monitoring units,
   wherein, for overlapping regions of the protected zone for which a plurality of the monitoring units have a capability of monitoring, fixing the regions at least in part such that only one of the monitoring units monitors the respective overlap region,
   and wherein boundary regions having a predefined width are fixed for boundaries between two part regions and are each associated with the two part regions.

17. The method in accordance with claim 16,
wherein the part regions are fixed at least in part for overlap regions of the protected zone for which a plurality of the monitoring units have a capability of monitoring, such that only exactly that respective monitoring unit monitors the overlap region which is closest to the respective overlap region with respect to the size of its detection zone.

18. A method of setting a plurality of part regions of a desired protected zone, the method comprising:
   detecting positions of a plurality of monitoring units, wherein each of the plurality of monitoring units detects a detection zone;
   determining a maximum size of each detection zone;
   fixing the desired protected zone in a graphical user interface;
   fixing the part regions to be monitored by the respective plurality of monitoring units with reference to the positions of the plurality of monitoring units, to the maximum size of the detection zones and to the desired protected zone;
   assigning the part regions to a respective one of the plurality of monitoring units; and
   excluding from monitoring a predetermined cut-out region as a region not monitored,
   wherein, for overlapping regions of the protected zone for which a plurality of the monitoring units have a capability of monitoring, fixing the regions at least in part such that only one of the monitoring units monitors the respective overlap region.

19. The method in accordance with claim 18,
and wherein boundary regions having a predefined width are fixed for boundaries between two part regions and are each associated with the two part regions.

20. The method in accordance with claim 19,
wherein the part regions are fixed at least in part for overlap regions of the protected zone for which a plurality of the monitoring units have a capability of monitoring, such that only exactly that respective monitoring unit monitors the overlap region which is closest to the respective overlap region with respect to the size of its detection zone.

\* \* \* \* \*